C. Monson,
Extension Table,
Nº 34,160. Patented Jan. 14, 1862.
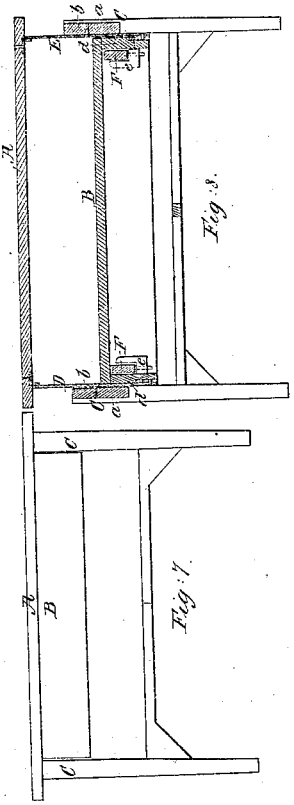
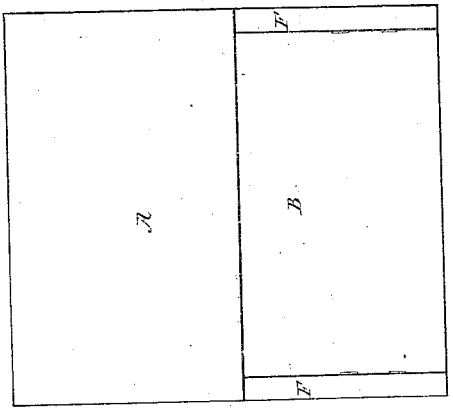
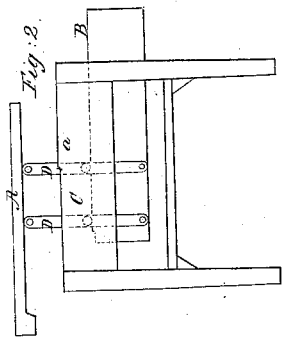
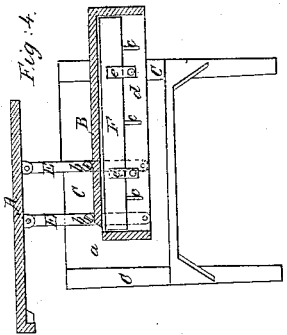
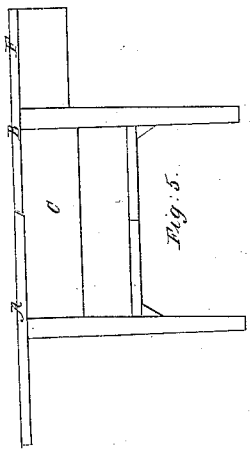
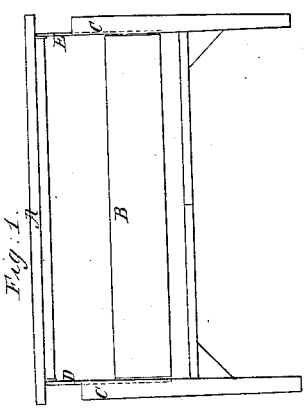
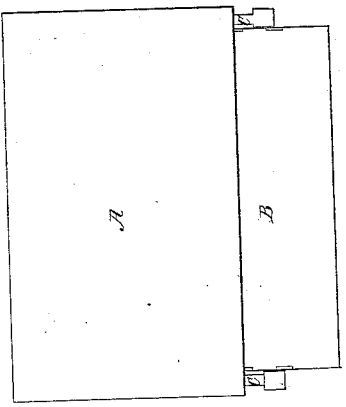
Witnesses;
Inventor;
Charles Monson

UNITED STATES PATENT OFFICE.

CHARLES MONSON, OF NEW HAVEN, CONNECTICUT.

IMPROVED EXTENSION-TABLE.

Specification forming part of Letters Patent No. 34,169, dated January 14, 1862.

*To all whom it may concern:*

Be it known that I, CHARLES MONSON, a citizen of the United States of America, and resident at or in the city and county of New Haven and State of Connecticut, have invented an Improved Extension-Table; and I do hereby declare the same to be fully described in the following specification, and represented in the accompanying drawings, in which—

Figure 1 is a front elevation, Fig. 2 an end elevation, Fig. 3 a top view, and Fig. 4 a transverse and central section, of the said table as it appears when partially unfolded. Fig. 5 exhibits it as entirely unfolded. Fig. 6 is a top view of it as entirely unfolded, while Fig. 7 is a front elevation of it in a folded state.

The nature of my invention consists in the said table as constructed with two leaves combined with a stand by means and so as to operate substantially as hereinafter specified, and, furthermore, with finishing-strips arranged or to be arranged with respect to said leaves and stand in manner and so as to operate as hereinafter set forth.

In the drawings, A represents the superior, while B is the inferior, leaf, C being the stand. The said leaf B is constructed in the form of a box inverted, and is placed between the two ends $a$ $a$ of the frame and parallel to the leaf A, this latter leaf being somewhat longer than the other, as shown in the drawings. The said two leaves at or near their adjacent extremities are connected together and to the stand C by means of two sets of parallel levers D D E E, which are arranged relatively to the said parts, as exhibited in the drawings. The fulcrum of each lever is at its middle, and projects from the table-stand, as shown at $b$ in Fig. 8, which is a longitudinal section of the table, taken through one of the levers of each set, the ends of each lever being jointed, respectively, to the two leaves. By the said application of the two leaves to the stand they may be moved thereon so as to bring one of them directly over and upon the other, as shown in Fig. 7, or so that the superior leaf may be moved in rear of and with its top surface in the same plane with that of the other, as exhibited in Fig. 6.

In order to finish out the inferior leaf or make it of a size in correspondence with that of the other, while the two leaves are in positions in relation to each other, as shown in the last-named figure, I employ two finishing bars or strips F F, each being furnished with three or any other suitable number of pins $c$ $c$, &c., to project from its edge and enter corresponding holes made within the leaf B. One of the said bars is to be arranged against each end of the leaf B and to rest upon the stand C. When in such position, such bar not only answers the purpose above set forth, but also that of holding up the leaf B, or, in other words, preventing it from being moved downward within the stand. When not in use in manner as described, the said finishing-bars may be applied to the inner sides of the end parts $d$ $d$ of the box-leaf B and be secured thereto by turn-buttons $e$ $e$, the whole being as shown in the drawings.

The above mode of constructing an extension-table renders it very portable, compact, and convenient.

I claim as my invention—

1. The improved extension-table, as constructed with two leaves A B, combined with the stand C by means and so as to operate substantially as specified.

2. In combination with the leaves and stand when made and applied together, as described, the finishing bars or strips F F, to be arranged in manner and for the purpose substantially as set forth.

CHARLES MONSON.

Witnesses:
 DANIEL MERRILL,
 HENRY W. COLLETT.